(12) United States Patent
Martellaro (10) Patent No.: US 7,398,737 B1
(45) Date of Patent: Jul. 15, 2008

(54) TWO-LEGGED TABLE FOR VEHICLES

(76) Inventor: Rosanna Martellaro, 65 Dock St., Copiague, NY (US) 11726

( * ) Notice: Subject to any disclaimer, the term of this patent is extended or adjusted under 35 U.S.C. 154(b) by 0 days.

(21) Appl. No.: 11/425,592

(22) Filed: Jun. 21, 2006

Related U.S. Application Data (60) Provisional application No. 60/692,970, filed on Jun. 23, 2005.

(51) Int. Cl.
*A47B 23/00* (2006.01)

(52) U.S. Cl. .......................... 108/44; 108/143; 108/180

(58) Field of Classification Search .................. 108/44, 108/43, 59, 65, 27, 83, 69, 153.1, 158.12, 108/137, 143, 102, 64, 180
See application file for complete search history.

(56) References Cited

U.S. PATENT DOCUMENTS

| 273,884 | A | * | 3/1883 | Patrick | 108/69 |
|---|---|---|---|---|---|
| 2,596,663 | A | * | 5/1952 | Duffy | 108/69 |
| 2,705,179 | A | * | 3/1955 | Hodgin | 108/64 |
| 4,010,696 | A | | 3/1977 | Priesman | |
| 4,020,771 | A | * | 5/1977 | Hasenour | 108/86 |
| 4,297,952 | A | * | 11/1981 | Zagaroli | 108/83 |
| 4,887,526 | A | * | 12/1989 | Blatt | 108/44 |
| 4,909,159 | A | | 3/1990 | Gonsoulin | |
| 5,505,139 | A | | 4/1996 | Storholm | |
| 6,109,188 | A | * | 8/2000 | Russell | 108/44 |
| 7,107,913 | B2 | * | 9/2006 | Smith | 108/64 |

* cited by examiner

*Primary Examiner*—José V Chen (57) ABSTRACT

A foldable table includes a table top including confronting sections that are removably engageable so that a rectangular top surface is formed when the sections are abutted. The top surface spans across the back seat of the vehicle and is position within the vehicle. First and second sections have coextensively shaped front edges spanning along an entire top surface length. Third and fourth sections have coextensively shaped rear edges spanning along the entire top surface length. A guard rail is conjoined to an outer periphery of each section, wherein first, second, third and fourth rails are detachably abutted at an end-to-end orientation. First and second legs are coupled to the third and fourth sections, and have bottom ends positioned on a floor of the vehicle. A mechanism is included for releasably locking all the sections at an engaged position during transit, and is spaced from the legs.

18 Claims, 5 Drawing Sheets

TWO-LEGGED TABLE FOR VEHICLES

CROSS REFERENCE TO RELATED APPLICATIONS

This application claims the benefit of U.S. Provisional Application No. 60/692,970, filed Jun. 23, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to tables and, more particularly, to a two-legged table for vehicles for specifically providing a support surface along a back seat of a vehicle and for transporting goods thereon.

2. Prior Art

Many businessmen, especially those involved in home improvement sales and construction work, find it necessary to work from their vehicles each day. Bids must be left with the homeowner or property owner at the same time as the sales call. This necessitates writing and drafting documents while in the vehicle. While the need for a mobile office has been partially recognized by prior art, unresolved shortcomings still remain such as lack of open, easily accessible storage areas, lack of a simple way to remove and store the unit, as well as many other needs.

One prior art example discloses a portable shuffle desk which can be used on the lap of the owner or on other uneven surfaces by adjusting pellets in a bottom portion thereof to fit contoured surfaces. This assembly can be utilized in a vehicle by the driver (if placed on the passenger side), but provides no storage or room for supplies. Thus, it is of very little use to the businessman who wanted desk-type convenience from the driver position. No provision is provided for securing the apparatus into a seat to prevent possible injury in case of an accident.

Another prior art example shows a portable desk/briefcase, but the assembly lacks a large work area that is so necessary when working with rulers, calculators, etc. The organizer file featured in this desk/briefcase is positioned on the back rest of the passenger seat, causing possible obstruction to the right arm when drawings, sketches, or contracts are being written. In addition, no convenient area for a portable telephone or computer is available. All storage is inside the briefcase and inconveniently located.

A further prior art example discloses an auto desk, which features an enclosed chamber. This assembly is unhandy for most businessmen who do bids and contracts at a customer's home site because it necessitates opening up the cover each time materials are needed, instead of having them easily accessible. There is no openly accessible filing area for larger items, instead they must stored sideways inside the box portion.

Accordingly, a need remains for a two-legged table for vehicles in order to overcome the above-noted shortcomings. The present invention satisfies such a need by providing a table assembly that is convenient and easy to use, is durable yet lightweight in design, is versatile in its applications, is easily adaptable to a variety of vehicles, and provides a convenient work surface within a vehicle. Such a table assembly provides users a simple way in which to transport a variety of items within their vehicle. Whether one is transporting a beautiful vase of flowers, a terrarium containing a pet turtle, or business materials, the assembly enables users to move these items safely and easily without having to worry that they might slide about and fall.

BRIEF SUMMARY OF THE INVENTION

In view of the foregoing background, it is therefore an object of the present invention to provide a two-legged table for vehicles. These and other objects, features, and advantages of the invention are provided by a foldable table for specifically providing a support surface along a back seat of a vehicle and for transporting goods thereon.

The foldable table includes a table top including a plurality of adjustably confronting sections that are removably engageable in such a manner that a continuous and rectangular top surface is formed when the sections are directly abutted against each other. Such a table top spans across the entire back seat of the vehicle and is position within the vehicle during driving conditions. First and second ones of the sections have coextensively shaped front edges spanning along an entire longitudinal length of the table top. Third and fourth ones of the sections have coextensively shaped rear edges spanning along the entire longitudinal length of the table top such that the rear edges and the front edges are registered parallel to each other.

Each of the first, second, third and fourth sections have a corresponding guard rail that is directly conjoined to associated outer peripheries thereof respectively. Such guard rails includes: first, second, third and fourth sections that are detachably abutted at an end-to-end orientation along the external peripheries of the table top.

First and second legs are directly coupled to the third and fourth sections. Such first and second legs have bottom ends directly positioned on a floor of the vehicle such that the first and second sections effectively rest directly on the back seat of the vehicle and conveniently maintain the table top registered at a horizontal plane. The first and second legs may be telescopically extendable and retractable for conveniently and effectively horizontally aligning a height of the body with the back seat of the vehicle. Each of the first and second legs include a pivotal bracket connected to a bottom surface of the third and fourth sections respectively. Such a brackets is arranged in such a manner that the first and second legs are articulated to a folded position defined along a plane horizontal aligned with the table top when the brackets are swiveling to a folded position respectively.

A mechanism is included for releasably locking the first, second, third and fourth sections at an engaged position during transit. The releasably locking mechanism is spaced from the first and second legs respectively. The releasably locking mechanism preferably includes a first pair of L-shaped anchor fingers that are directly connected to corresponding bottom surfaces of the first and second sections. Each of the first pair of fingers has corresponding longitudinal lengths traversing beyond an associated inner edge of the first and second sections in such a manner that the first pair of fingers effectively become interlocked and statically maintained at a locked position when biased parallel to each other and traversed across the inner edges respectively.

The releasably locking mechanism may include a second pair of L-shaped anchor fingers that are directly connected to corresponding bottom surfaces of the first and fourth sections.

Each of the second pair of fingers has corresponding longitudinal lengths traversing beyond an associated inner edge of the first and fourth sections in such a manner that the second pair of fingers effectively become interlocked and statically maintained at a locked position when biased parallel to each other and traversed across the inner edges respectively.

The releasably locking mechanism preferable further includes a third pair of L-shaped anchor fingers that are directly connected to corresponding bottom surfaces of the second and third sections. Each of the third pair of fingers has corresponding longitudinal lengths traversing beyond an associated inner edge of the second and third sections in such a manner that the third pair of fingers effectively become interlocked and statically maintained at a locked position when biased parallel to each other and traversed across the inner edges respectively.

The releasably locking mechanism may further include a fourth pair of L-shaped anchor fingers that are directly connected to corresponding bottom surfaces of the third and fourth sections. Each of the fourth pair of fingers has corresponding longitudinal lengths traversing beyond an associated inner edge of the third and fourth sections in such a manner that the fourth pair of fingers effectively become interlocked and statically maintained at a locked position when biased parallel to each other and traversed across the inner edges respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set fourth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set fourth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-8 by the reference numeral 10 and is intended to provide a two-legged table for vehicles. It should be understood that the assembly 10 may be used to hold many different types of items and should not be limited in use to only transporting work related items within a vehicle.

Initially referring to FIGS. 1, 2, 3, 4, 5, 6, 7 and 8, the assembly 10 includes a table top 20 including a plurality of adjustably confronting sections 21 that are removably engageable in such a manner that a continuous and rectangular top surface 22 is formed when the sections 21 are directly abutted, without the use of intervening elements, against each other. Of course, the top surface 22 may be covered in a non-skid material for effectively preventing items placed thereon from sliding about, as is obvious to a person of ordinary skill in the art.

Such a table top 20 spans across the entire back seat 11 of the vehicle and is position within the vehicle during driving conditions. Of course, the table top 20 and its respective sections 21 may be produced in a variety of different dimensions for accommodating alternately shaped back seats, as is obvious to a person of ordinary skill in the art. First 21A and second 21B ones of the sections 21 have coextensively shaped front edges 23 spanning along an entire longitudinal length of the table top 20. Third 21C and fourth 21D ones of the sections 21 have coextensively shaped rear edges 24 spanning along the entire longitudinal length of the table top 20 such that the rear edges 24 and the front edges 23 are registered parallel to each other.

Referring to FIGS. 1, 2, 3 and 4, each of the first 21A, second 21B, third 21C and fourth 21D sections have a corresponding guard rail 25 that is directly conjoined, without use of intervening elements, to associated outer peripheries 26 thereof respectively. Such guard rails 25 includes first 25A, second 25B, third 25C and fourth 25D sections that are detachably abutted at an end-to-end orientation along the external peripheries 26 of the table top 20.

Figure 1:
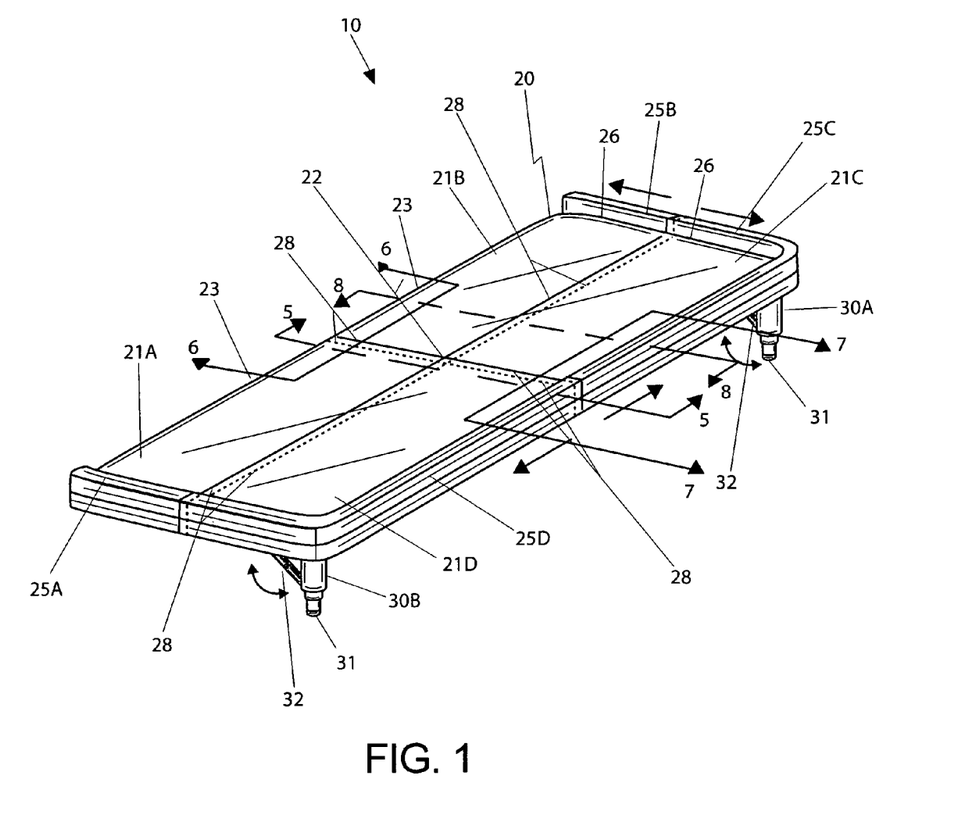
FIG. 1 is a perspective view showing a two-legged table for vehicles, in accordance with the present invention.
Figure 2:
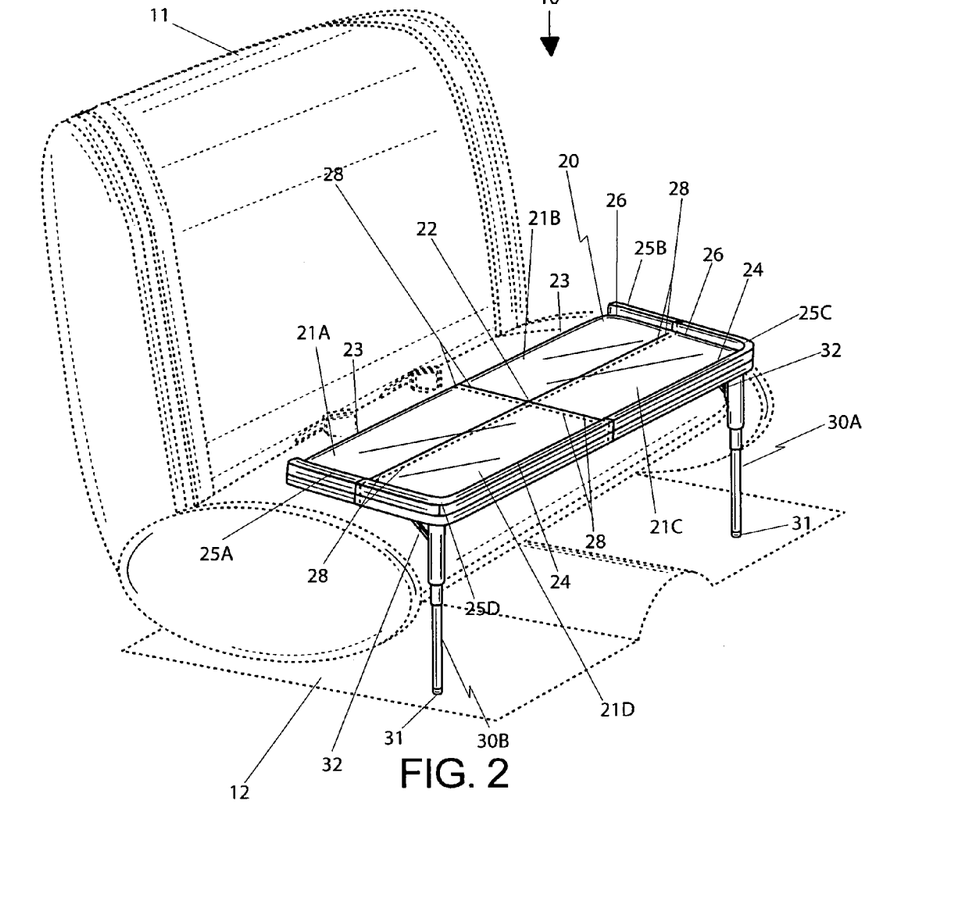
FIG. 2 is a perspective view of the table shown in FIG. 1, showing same during operating conditions.
Figure 3:
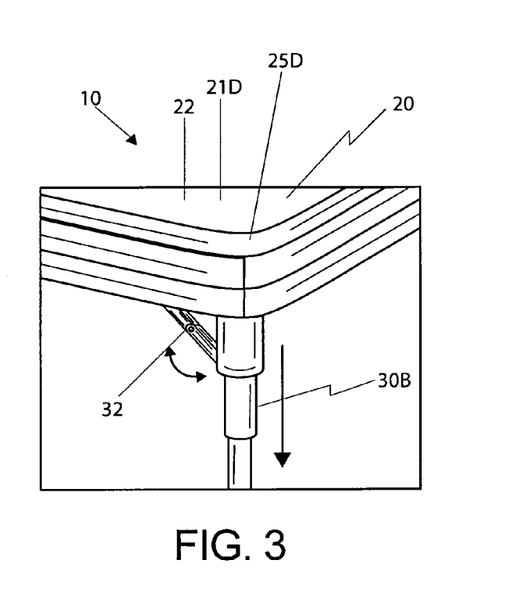
FIG. 3 is an enlarged perspective view of one of the legs shown in FIG. 2.
Figure 4:
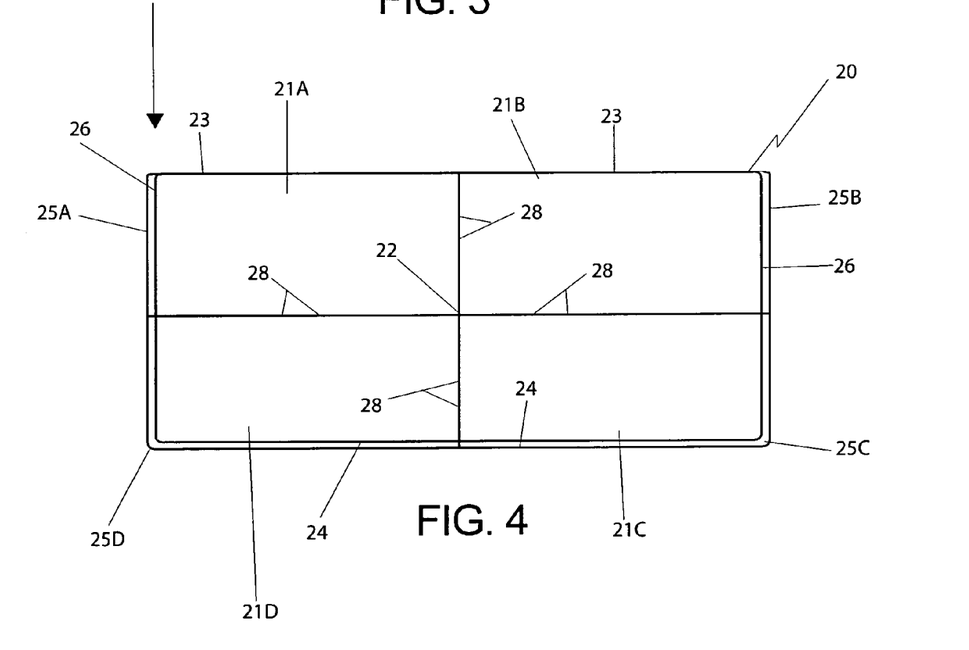
FIG. 4 is a top plan view of the assembly shown in FIG. 1.

Referring to FIGS. 1, 2 and 3, first 30A and second 30B legs are directly coupled, without the use of intervening elements, to the third 21C and fourth 21D sections. Such first 30A and second 30B legs have bottom ends 31 directly positioned, without the use of intervening elements, on a floor 12 of the vehicle such that the first 21A and second 21B sections effectively rest directly, without the use of intervening elements, on the back seat 11 of the vehicle and conveniently maintain the table top 20 registered at a horizontal plane. This is a crucial feature for ensuring that items placed onto the top surface 22 do not slide about or fall off during transit. The first 30A and second 30B legs are telescopically extendable and retractable, which is essential for conveniently and effectively horizontally aligning a height of the table top 20 with the back seat 11 of the vehicle.

Each of the first 30A and second 30B legs include a pivotal bracket 32 connected to a bottom surface 27 of the third 21C and fourth 21D sections respectively. Such brackets 32 are arranged in such a manner that the first 30A and second 30B legs are articulated to a folded position defined along a plane horizontally aligned with the table top 20 when the brackets 32 are swiveling to a folded position respectively.

Figure 5:
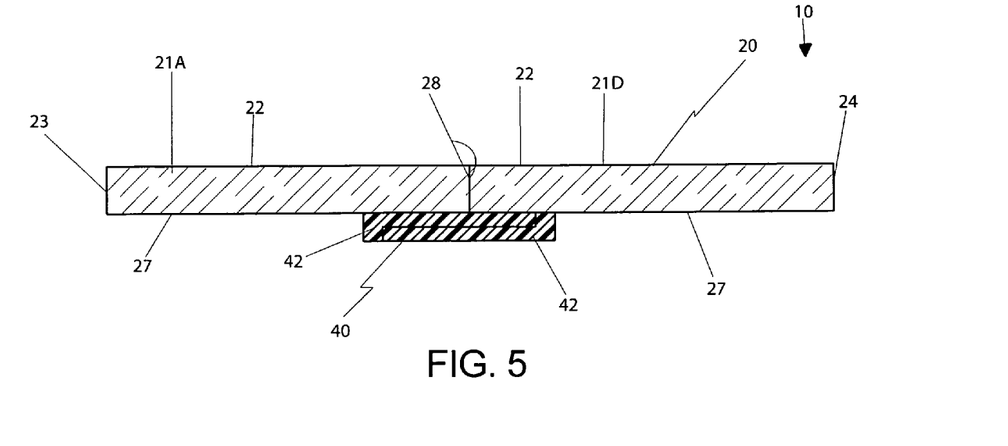
FIG. 5 is a cross-sectional view of the assembly shown in FIG. 1, taken along line 5-5.
Figure 6:
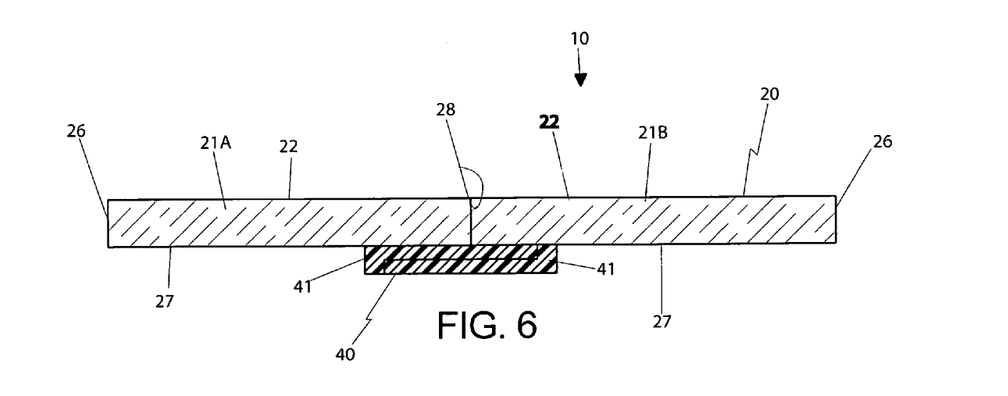
FIG. 6 is a cross-sectional view of the assembly shown in FIG. 1, taken along line 6-6.
Figure 7:
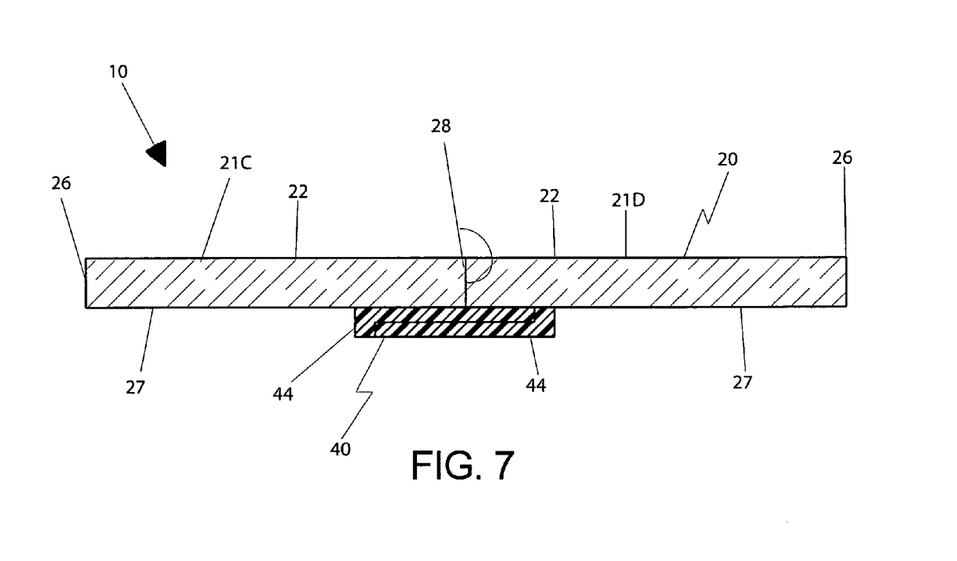
FIG. 7 is a cross-sectional view of the assembly shown in FIG. 1, taken along line 7-7.

Referring to FIGS. 5, 6, 7 and 7, a mechanism 40 is included for releasably locking the first 21A, second 21B, third 21C and fourth 21D sections at an engaged position during transit. The releasably locking mechanism 40 is spaced from the first 30A and second 30B legs respectively. The releasably locking mechanism 40 includes a first pair of L-shaped anchor fingers 41 that are directly connected, without the use of intervening elements, to corresponding bottom surfaces 27 of the first 21A and second 21B sections. Each of the first pair of fingers 41 has corresponding longitudinal lengths traversing beyond an associated inner edge 28 of the first 21A and second 21B sections in such a manner that the first pair of fingers 41 effectively become interlocked and statically maintained at a locked position when biased parallel to each other and traversed across the inner edges 28 respectively, as is best shown in FIG. 6.

Figure 8:
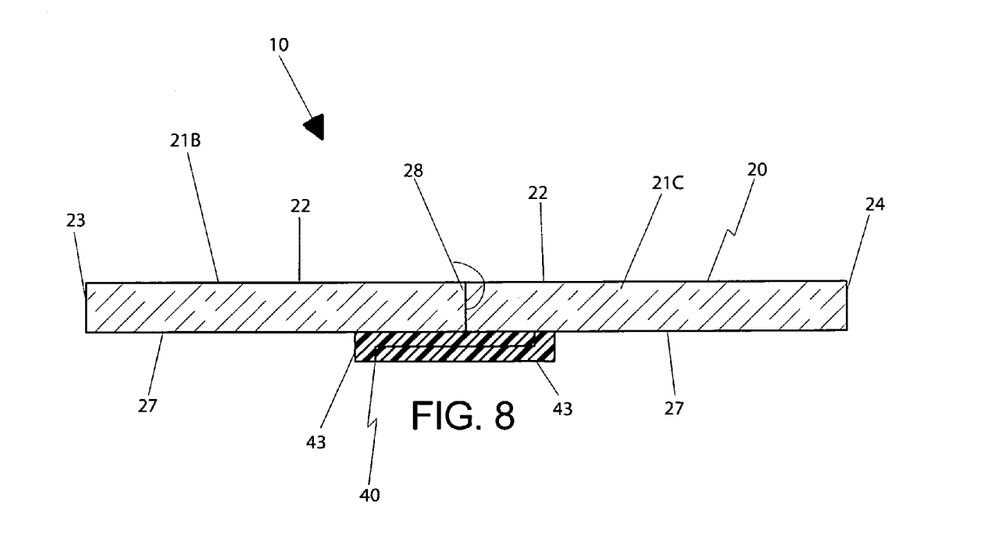
FIG. 8 is a cross-sectional view of the assembly shown in FIG. 1, taken along line 8-8.

Referring to FIGS. 5 and 8, the releasably locking mechanism 40 includes a second pair of L-shaped anchor fingers 42 that are directly connected, without the use of intervening elements, to corresponding bottom surfaces 27 of the first 21A and fourth 21D sections. Each of the second pair of fingers 42 has corresponding longitudinal lengths traversing beyond an associated inner edge 28 of the first 21A and fourth 21D sections in such a manner that the second pair of fingers 42 effectively become interlocked and statically maintained at a locked position when biased parallel to each other and traversed across the inner edges 28 respectively, as is best shown in FIG. 5.

The releasably locking mechanism 40 further includes a third pair of L-shaped anchor fingers 43 that are directly connected, without the use of intervening elements, to corresponding bottom surfaces 27 of the second 21B and third 21C sections, as is best shown in FIG. 8. Each of the third pair of fingers 43 has corresponding longitudinal lengths traversing beyond an associated inner edge 28 of the second 21B and third sections 21C in such a manner that the third pair of fingers 43 effectively become interlocked and statically maintained at a locked position when biased parallel to each other and traversed across the inner edges 28 respectively.

Referring to FIG. 7, the releasably locking mechanism 40 also includes a fourth pair of L-shaped anchor fingers 44 that are directly connected, without the use of intervening elements, to corresponding bottom surfaces 27 of the third 21C and fourth 21D sections, as is best shown in FIG. 7. Each of the fourth pair of fingers 44 has corresponding longitudinal lengths traversing beyond an associated inner edge 28 of the third 21C and fourth 21D sections in such a manner that the fourth pair of fingers 44 effectively become interlocked and statically maintained at a locked position when biased parallel to each other and traversed across the inner edges 28 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A foldable table for specifically providing a support surface along an existing back seat of a vehicle and for transporting goods thereon, said foldable table comprising:

a table top including a plurality of adjustably confronting sections removably engageable in such a manner that a continuous and rectangular top surface is formed when said sections are directly abutted against each other, said table top spanning across the entire back seat of the vehicle and being position within the vehicle during driving conditions, first and second ones of said sections having coextensively shaped front edges spanning along an entire longitudinal length of said table top, third and fourth ones of said sections having coextensively shaped rear edges spanning along the entire longitudinal length of said table top such that said rear edges and said front edges are registered parallel to each other;

each of said first, second, third and fourth sections having a corresponding guard rail directly conjoined to associated outer peripheries thereof respectively;

first and second legs directly coupled to said third and fourth sections, said first and second legs having bottom ends directly positioned on a floor of the vehicle such that said first and second sections rest directly on the back seat of the vehicle and maintain said table top registered at a horizontal plane; and means for releasably locking said first, second, third and fourth sections at an engaged position during transit such that the longitudinal length and a latitudinal length of said table top is selectively increased and decreased, said engaged position being defined by slidably biasing adjacent sides of said first, second, third and fourth sections against each other respectively.

2. The assembly of claim 1, wherein said releasably locking means comprises:

a first pair of L-shaped anchor fingers directly connected to corresponding bottom surfaces of said first and second sections, each of said first pair of fingers having corresponding longitudinal lengths traversing beyond an associated inner edge of said first and second sections in such a manner that said first pair of fingers become interlocked and statically maintained at a locked position when biased parallel to each other and traversed across said inner edges respectively.

3. The assembly of claim 1, wherein said releasably locking means comprises:

a second pair of L-shaped anchor fingers directly connected to corresponding bottom surfaces of said first and fourth sections, each of said second pair of fingers having corresponding longitudinal lengths traversing beyond an associated inner edge of said first and fourth sections in such a manner that said second pair of fingers become interlocked and statically maintained at a locked position when biased parallel to each other and traversed across said inner edges respectively.

4. The assembly of claim 1, wherein said releasably locking means comprises:

a third pair of L-shaped anchor fingers directly connected to corresponding bottom surfaces of said second and third sections, each of said third pair of fingers having corresponding longitudinal lengths traversing beyond an associated inner edge of said second and third sections in such a manner that said third pair of fingers become interlocked and statically maintained at a locked position when biased parallel to each other and traversed across said inner edges respectively.

5. The assembly of claim 1, wherein said releasably locking means comprises:
a fourth pair of L-shaped anchor fingers directly connected to corresponding bottom surfaces of said third and fourth sections, each of said fourth pair of fingers having corresponding longitudinal lengths traversing beyond an associated inner edge of said third and fourth sections in such a manner that said fourth pair of fingers become interlocked and statically maintained at a locked position when biased parallel to each other and traversed across said inner edges respectively.

6. The assembly of claim 1, wherein said first and second legs are telescopically extendable and retractable for horizontally aligning a height of said body with the back seat of the vehicle, wherein each of said first and second legs comprises
a pivotal bracket connected to a bottom surface of said third and fourth sections respectively, said brackets being arranged in such a manner that said first and second legs are articulated to a folded position defined along a plane horizontal aligned with said table top when said brackets are swiveling to a folded position respectively.

7. A foldable table for specifically providing a support surface along a back seat of a vehicle and for transporting goods thereon, said foldable table comprising:
a table top including a plurality of adjustably confronting sections removably engageable in such a manner that a continuous and rectangular top surface is formed when said sections are directly abutted against each other, said table top spanning across the entire back seat of the vehicle and being position within the vehicle during driving conditions, first and second ones of said sections having coextensively shaped front edges spanning along an entire longitudinal length of said table top, third and fourth ones of said sections having coextensively shaped rear edges spanning along the entire longitudinal length of said table top such that said rear edges and said front edges are registered parallel to each other;
each of said first, second, third and fourth sections having a corresponding guard rail directly conjoined to associated outer peripheries thereof respectively, wherein said guard rail comprises: first, second, third and fourth sections detachably abutted at an end-to-end orientation along said external peripheries of said table top;
first and second legs directly coupled to said third and fourth sections, said first and second legs having bottom ends directly positioned on a floor of the vehicle such that said first and second sections rest directly on the back seat of the vehicle and maintain said table top registered at a horizontal plane; and
means for releasably locking said first, second, third and fourth sections at an engaged position during transit such that the longitudinal length and a latitudinal length of said table top is selectively increased and decreased, said engaged position being defined by slidably biasing adjacent sides of said first, second, third and fourth sections against each other respectively.

8. The assembly of claim 7, wherein said releasably locking means comprises:
a first pair of L-shaped anchor fingers directly connected to corresponding bottom surfaces of said first and second sections, each of said first pair of fingers having corresponding longitudinal lengths traversing beyond an associated inner edge of said first and second sections in such a manner that said first pair of fingers become interlocked and statically maintained at a locked position when biased parallel to each other and traversed across said inner edges respectively.

9. The assembly of claim 8, wherein said releasably locking means comprises:
a second pair of L-shaped anchor fingers directly connected to corresponding bottom surfaces of said first and fourth sections, each of said second pair of fingers having corresponding longitudinal lengths traversing beyond an associated inner edge of said first and fourth sections in such a manner that said second pair of fingers become interlocked and statically maintained at a locked position when biased parallel to each other and traversed across said inner edges respectively.

10. The assembly of claim 9, wherein said releasably locking means comprises:
a third pair of L-shaped anchor fingers directly connected to corresponding bottom surfaces of said second and third sections, each of said third pair of fingers having corresponding longitudinal lengths traversing beyond an associated inner edge of said second and third sections in such a manner that said third pair of fingers become interlocked and statically maintained at a locked position when biased parallel to each other and traversed across said inner edges respectively.

11. The assembly of claim 10, wherein said releasably locking means comprises:
a fourth pair of L-shaped anchor fingers directly connected to corresponding bottom surfaces of said third and fourth sections, each of said fourth pair of fingers having corresponding longitudinal lengths traversing beyond an associated inner edge of said third and fourth sections in such a manner that said fourth pair of fingers become interlocked and statically maintained at a locked position when biased parallel to each other and traversed across said inner edges respectively.

12. The assembly of claim 11, wherein said first and second legs are telescopically extendable and retractable for horizontally aligning a height of said body with the back seat of the vehicle, wherein each of said first and second legs comprises
a pivotal bracket connected to a bottom surface of said third and fourth sections respectively, said brackets being arranged in such a manner that said first and second legs are articulated to a folded position defined along a plane horizontal aligned with said table top when said brackets are swiveling to a folded position respectively.

13. A foldable table for specifically providing a support surface for transporting goods thereon, said foldable table comprising:
a table top including a plurality of adjustably confronting sections removably engageable in such a manner that a continuous and rectangular top surface is formed when said sections are directly abutted against each other, first and second ones of said sections having coextensively shaped front edges spanning along an entire longitudinal length of said table top, third and fourth ones of said sections having coextensively shaped rear edges spanning along the entire longitudinal length of said table top such that said rear edges and said front edges are registered parallel to each other;
each of said first, second, third and fourth sections having a corresponding guard rail directly conjoined to associated outer peripheries thereof respectively, wherein said guard rail comprises: first, second, third and fourth sections detachably abutted at an end-to-end orientation along said external peripheries of said table top;

first and second legs directly coupled to said third and fourth sections, said first and second sections maintaining said table top registered at a horizontal plane; and means for releasably locking said first, second, third and fourth sections at an engaged position during transit such that the longitudinal length and a latitudinal length of said table top is selectively increased and decreased, said engaged position being defined by slidably biasing adjacent sides of said first, second, third and fourth sections against each other respectively, wherein said releasably locking means are spaced from said first and second legs respectively.

14. The assembly of claim 13, wherein said releasably locking means comprises:

a first pair of L-shaped anchor fingers directly connected to corresponding bottom surfaces of said first and second sections, each of said first pair of fingers having corresponding longitudinal lengths traversing beyond an associated inner edge of said first and second sections in such a manner that said first pair of fingers become interlocked and statically maintained at a locked position when biased parallel to each other and traversed across said inner edges respectively.

15. The assembly of claim 14, wherein said releasably locking means comprises:

a second pair of L-shaped anchor fingers directly connected to corresponding bottom surfaces of said first and fourth sections, each of said second pair of fingers having corresponding longitudinal lengths traversing beyond an associated inner edge of said first and fourth sections in such a manner that said second pair of fingers become interlocked and statically maintained at a locked position when biased parallel to each other and traversed across said inner edges respectively.

16. The assembly of claim 15, wherein said releasably locking means comprises:

a third pair of L-shaped anchor fingers directly connected to corresponding bottom surfaces of said second and third sections, each of said third pair of fingers having corresponding longitudinal lengths traversing beyond an associated inner edge of said second and third sections in such a manner that said third pair of fingers become interlocked and statically maintained at a locked position when biased parallel to each other and traversed across said inner edges respectively.

17. The assembly of claim 16, wherein said releasably locking means comprises:

a fourth pair of L-shaped anchor fingers directly connected to corresponding bottom surfaces of said third and fourth sections, each of said fourth pair of fingers having corresponding longitudinal lengths traversing beyond an associated inner edge of said third and fourth sections in such a manner that said fourth pair of fingers become interlocked and statically maintained at a locked position when biased parallel to each other and traversed across said inner edges respectively.

18. The assembly of claim 17, wherein said first and second legs are telescopically extendable and retractable, wherein each of said first and second legs comprises a pivotal bracket connected to a bottom surface of said third and fourth sections respectively, said brackets being arranged in such a manner that said first and second legs are articulated to a folded position defined along a plane horizontal aligned with said table top when said brackets are swiveling to a folded position respectively.

* * * * *